United States Patent
Tetik et al.

(10) Patent No.: US 8,195,829 B2
(45) Date of Patent: Jun. 5, 2012

(54) STREAMING MEDIA PLAYER AND METHOD

(75) Inventors: Yusuf Engin Tetik, Manisa (TR); Yusuf Selcuk Ateskan, Manisa (TR); Orhan Coskun, Manisa (TR); Ahmet Sahin, Manisa (TR)

(73) Assignee: Vestel Elektronik Sanayi Ve Ticaret A.S., Manisa (TR)

( * ) Notice: Subject to any disclaimer, the term of this patent is extended or adjusted under 35 U.S.C. 154(b) by 701 days.

(21) Appl. No.: 12/348,936

(22) Filed: Jan. 6, 2009

(65) Prior Publication Data

US 2009/0204842 A1 Aug. 13, 2009

Related U.S. Application Data

(60) Provisional application No. 61/019,465, filed on Jan. 7, 2008.

(51) Int. Cl.
*G06F 15/16* (2006.01)
(52) U.S. Cl. ...................................... 709/233
(58) Field of Classification Search ........... 709/231–235
See application file for complete search history.

(56) References Cited

U.S. PATENT DOCUMENTS

| | | | |
|---|---|---|---|
| 5,583,652 A | 12/1996 | Ware | |
| 5,664,044 A | 9/1997 | Ware | |
| 5,966,387 A | 10/1999 | Cloutier | |
| 6,665,751 B1 | 12/2003 | Chen | |
| 2003/0066094 A1 | 4/2003 | van der Schaar | |
| 2004/0032350 A1 | 2/2004 | Knapp | |
| 2006/0053455 A1* | 3/2006 | Mani et al. | 725/87 |
| 2007/0091935 A1 | 4/2007 | Yonezawa | |

OTHER PUBLICATIONS

Yoo, SangShin, Realization of the Synchronization Controller for Multimedia Applications, IEEE, Jan. 1, 1998, pp. 798 to 803 (6 pages).

* cited by examiner

*Primary Examiner* — Chirag R Patel
(74) *Attorney, Agent, or Firm* — Conley Rose, P.C.

(57) ABSTRACT

A streaming media player receives a media stream from a server. A clock comparator of the media player compares a clock value of the server with a clock value of the media player and generates a clock state value representing how much the server's clock value lags or leads the player's clock value. An output component of the media player generates an output media stream corresponding to the input media stream. A rate component of the media player receives the clock state value from the clock comparator and varies the rate of output of the media stream from the output component in dependency on the clock state value.

17 Claims, 3 Drawing Sheets

STREAMING MEDIA PLAYER

STREAMING MEDIA PLAYER AND METHOD

This application claims the benefit of priority to U.S. application Ser. No. 61/019,465, filed Jan. 7, 2008, the content of which is hereby incorporated by reference in its entirety for all purposes.

FIELD OF INVENTION

The invention relates to a streaming media player and to a method in a streaming media player of generating a media stream as an output.

BACKGROUND

There is an increasing demand for the transmission of media streams over networks, particularly over the Internet. Streaming servers, which deliver the data to media players running on client computers, send the data at a prescribed average data rate. This average data rate is maintained by scheduling algorithms running on the streaming server.

Early media players for decoding audio and video typically required that the entire content be downloaded from a server onto the local computer before the player starts playing the decoded audio and video.

Recent players support streaming capabilities, i.e. the ability to play video and audio without having to have received the entire content before starting to play the video and audio. This is achieved by the media streaming player buffering some of the received data and starting to play audio and video that has been received before the entire content has arrived at the client computer. If the data rate of the incoming media stream is not sufficient and the buffer underflows, the player pauses to allow more data to arrive from the streaming server and resumes playing the audio and video only when its buffer is sufficiently filled again. On the other hand, if the data rate of the incoming media stream is too high, the buffer in the media player can overflow. In that case, video and/or audio data is dropped by the media player in order to allow the media player to catch up with the data that is being received. Buffering also compensates for jitter in the channel over which the audio and video is received.

It will be appreciated that with these prior art streaming media players, the pauses that are used to deal with buffer underflow disrupt the playback of the content, which is annoying and disturbing to the listener/viewer of the content. On the other hand, dropping of video and/or audio data to deal with buffer overflow can lead to visible and/or audible loss of quality.

FIG. 1 shows schematically the operation of such prior art streaming media players. In particular, there is shown a standard streaming server 101, a network communication link 102, and a standard streaming media player 103 in communication with the streaming server 101 via the network communication link 102.

In the standard streaming server 101, audio, video and other inputs are input to the streaming server 101 through one or more capture devices. In FIG. 1, an audio capture device 104 and a video capture device 105 are shown, though the possible capture devices which may be present in a streaming server 101 are not limited to audio and video. Audio data captured by the audio capture device 104 is sent to an audio encoder 106 for encoding. Video data captured by the video capture device 105 is sent to a video encoder 107 for encoding. Encoded media data, in this example audio and video data, are multiplexed by a multiplexer device 108 which also gets the server's clock value from a clock 109 of the server 101.

The multiplexed media stream which is output by the multiplexer device 108 is sent over the network communication link 102 to the streaming media player 103.

The known streaming media player 103 buffers the incoming media stream using an input buffer 110. The media is passed from the input buffer 110 to a demultiplexer device 111, which demultiplexes the different media streams (e.g. the audio and video components of the incoming media stream). The demultiplexer device 111 also reads the server's clock value, which is provided by the server 101 in the media stream. The demultiplexer device 111 updates the player's clock 112 with the server's clock value so that, in principle, the streaming media player 103 can play back the content at the correct rate. Encoded audio and video outputs of the demultiplexer device 111 are input into an audio decoder device 113 and a video decoder device 114 respectively. Decoded audio is sent to an audio renderer 115 from the audio decoder device 113 and decoded video is sent to a video renderer 116 video decoder device 114 respectively.

U.S. Pat. No. 6,665,751 discloses a streaming media player that is capable of dynamically changing its play back rate to allow for varying network conditions. The play back rate of the streaming media player is varied according to the state of the buffer of the streaming media player, i.e. how full or empty the buffer is according to a predetermined buffer size and predetermined thresholds. However, it is difficult to determine in advance an optimal buffer size and values for the thresholds and, in any event, these will vary from media stream to media stream.

According to a first aspect of the invention, there is provided a streaming media player for receiving from a server a media stream as an input and for generating a corresponding media stream as an output, the media player comprising:

a clock comparator arranged to compare a clock value of a server from which a media stream is received as an input with a clock value of the player, and to generate a clock state value representing how much the server's clock value lags or leads the player's clock value;

an output component arranged to generate an output media stream corresponding to said input media stream; and, a rate component arranged to receive a said clock state value from the clock comparator and to vary the rate of output of the media stream from the output component in dependency on the clock state value.

In this way, the streaming media player can adjust the rate of output of the media stream to minimise or prevent buffer underflow or overflow and thereby minimise or prevent pausing of playback and/or dropping of data. The playback rate can be dynamically adjusted if there is a difference between the server's clock rate and the player's clock rate to enable continuous and smooth playback of streaming media with little or no loss of data. The playback rate can be dynamically adjusted according to varying network conditions, which may lead to data packets arriving faster or slower than is optimal for the media player, again to enable continuous and smooth playback of streaming media with little or no loss of data. The media stream can be delivered to the media player in any of a number of ways, including for example as a broadcast or on-demand from the media player, and can be by wired or wireless connection, over the Internet, LANs, etc.

In an embodiment, the rate component is arranged to vary the rate of output of the media stream from the output component in proportion to the difference between the server's clock value and the player's clock value. In this way, the rate of output of the media stream can move towards the "correct" rate, as determined by the server's clock value, in a smooth way without jumps or pauses.

In an embodiment, the rate component is arranged to vary the rate of output of the media stream from the output component according to the formula:

$$s=m(SC(t)-PC(t))/(SC(t)-SC(t-1))$$

where:
- s is the speed up or slow down ratio with respect to the original rate of output;
- m is the maximum allowable slow down ratio with respect to the original rate of output;
- PC(t) is the player's clock value at sampling time t; and,
- SC(t) is the server's clock value at sampling time t.

In an embodiment, the output component is arranged to generate an output media stream that comprises audio. Preferably, the output component is arranged so that a change in the rate of output of the media stream does not affect the pitch of the audio that is output by the output component. A number of techniques are known for ensuring that the pitch of the audio does not change, or at least does not change perceptively.

In an embodiment, the output component is arranged to generate an output media stream that comprises synchronized audio and video. Preferably, the output component is arranged so that a change in the rate of output of the media stream does not affect the pitch of the audio that is output by the output component.

In an embodiment, the clock comparator is arranged to provide the clock state value to an audio speed controller of the rate component to control the rate of output of audio from the player, the audio speed controller is arranged to control a clock of the player, and the clock of the player is arranged to control a video speed controller which is arranged to control the rate of output of video from the player. In this embodiment, it is the playback speed of the audio that is primarily adjusted, with the playback speed of the video in effect being adjusted in dependence thereon. This can be preferable because, in general, skipping or pausing of audio is more noticeable to the user.

According to a second aspect of the invention, there is provided a method in a streaming media player of generating a media stream as an output corresponding to a media stream received as an input to the streaming media player from a server, the method comprising:
- comparing a clock value of a server from which a media stream is received as an input with a clock value of the player;
- generating a clock state value representing how much the server's clock value lags or leads the player's clock value;
- generating an output media stream corresponding to said input media stream; and,
- varying the rate of output of the media stream from the output component in dependency on the clock state value.

In an embodiment, the rate of output of the media stream is varied in proportion to the difference between the server's clock value and the player's clock value.

In an embodiment, the rate of output of the media stream is varied according to the formula:

$$s=m(SC(t)-PC(t))/(SC(t)-SC(t-1))$$

where:
- s is the speed up or slow down ratio with respect to the original rate of output;
- m is the maximum allowable slow down ratio with respect to the original rate of output;
- PC(t) is the player's clock value at sampling time t; and,
- SC(t) is the server's clock value at sampling time t.

In an embodiment, the media stream comprises audio. Preferably, a change in the rate of output of the media stream does not affect the pitch of the audio that is output by the output component.

In an embodiment, the media stream comprises synchronized audio and video. Preferably, a change in the rate of output of the media stream does not affect the pitch of the audio that is output by the output component.

In an embodiment, the clock comparator provides the clock state value to an audio speed controller of the rate component to control the rate of output of audio from the player, the audio speed controller controls a clock of the player, and the clock of the player controls a video speed controller which controls the rate of output of video from the player.

In an embodiment, the server's clock value is embedded within the input media stream received from the server. In another embodiment, the server's clock value is provided by the server to a source that is separate from the server and the media player, and the media player obtains the server's clock value from said separate source.

There is also provided a computer program comprising program instructions for instantiating a streaming media player on a computer to perform a method as described above. The computer program may be embodied on a computer-readable medium.

BRIEF DESCRIPTION OF THE DRAWINGS

Embodiments of the invention will now be described by way of example with reference to the accompanying drawings, in which.

Figure 1:
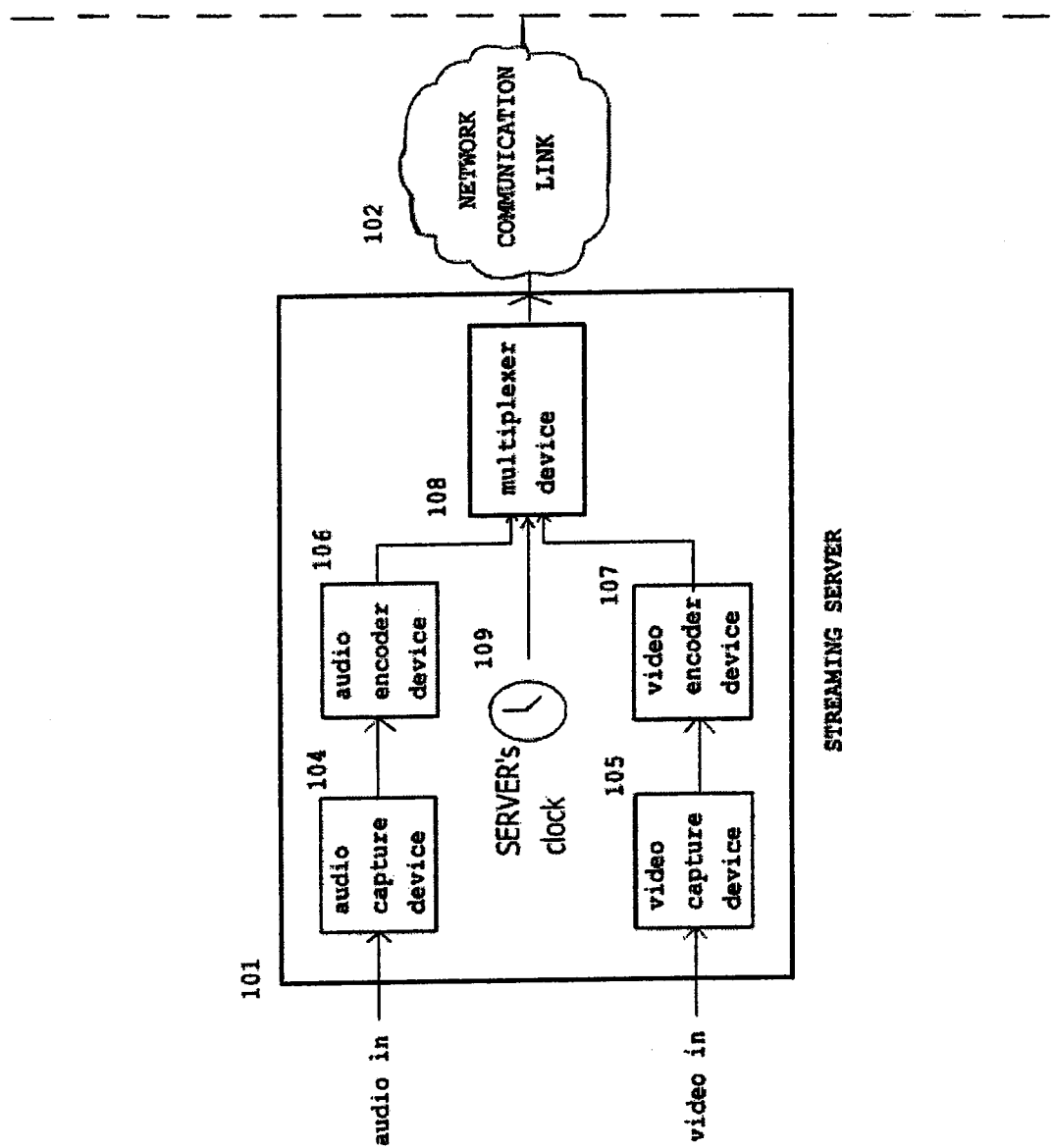
FIG. 1 shows schematically components of a prior art system comprising a streaming server, a network communication link and a streaming media player; and, FIG. 2 shows a schematic block diagram of an example of a streaming media player in accordance with an embodiment of the invention.
Figure 1:
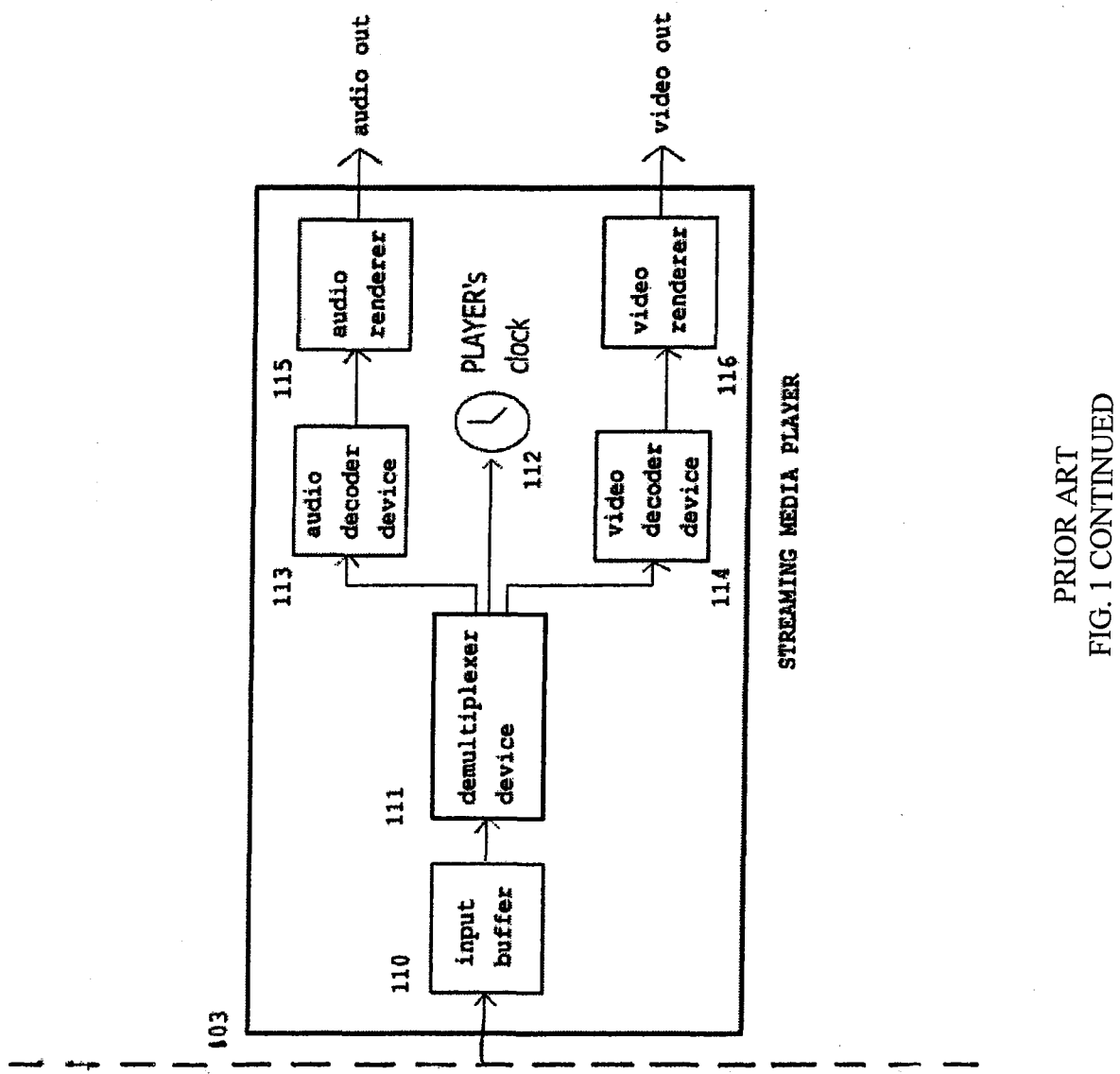
Figure 2:
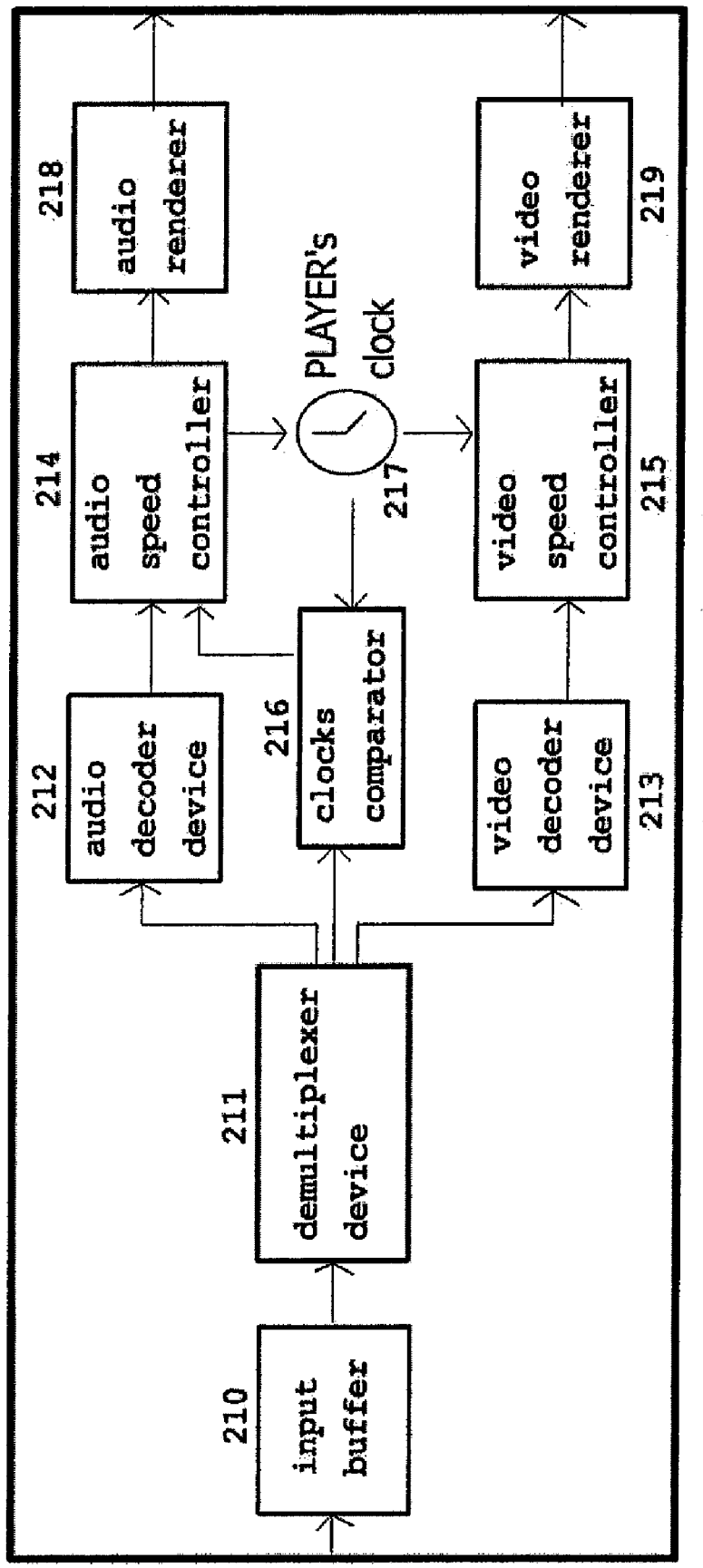
Referring to FIG. 2, there is shown a schematic block diagram of an example of a streaming media player 200 in accordance with an embodiment of the invention. The streaming media player 200 has a buffer 210 which receives and buffers an incoming media stream delivered from a streaming server (not shown in FIG. 2). The media data is passed from the input buffer 210 to a demultiplexer device 211, which demultiplexes the different media streams (e.g. the audio and video components of the incoming media stream). Encoded audio and video outputs of the demultiplexer device 211 are input into an audio decoder device 212 and a video decoder device 213 respectively. Decoded audio is sent from the audio decoder device 212 to an audio speed controller 214. Decoded video is sent from the video decoder device 213 to a video speed controller 215.

The demultiplexer device 211 also reads the server's clock value, which in one embodiment is provided by the server in the media stream, and passes the server's clock value as a first input to a clock's comparator 216 of the media player 200. The clock's comparator 216 receives as a second input the player's clock value from the player's clock 217. The clock's comparator 216 compares the server's and player's clock values and generates a clock state value, which is output by the clock's comparator 216 to the audio speed controller 214.

Decoded audio data is sent from the audio decoder device 212 to an audio renderer 218. The rate of data transfer from the audio decoder device 212 to the audio renderer 218 is controlled by the audio speed controller 214. Similarly, decoded video data is sent from the video decoder device 213 to a video renderer 219 and the rate of data transfer from the video decoder device 213 to the video renderer 219 is controlled by the video speed controller 215.

The clock state value generated by the clock's comparator 216 is input to the audio speed controller 214, which then updates the player's clock 217. The updated player's clock value is sent from the player's clock 217 to the video speed controller 215.

As will be understood, therefore, the player's clock speed is varied according to the clock state generated by the clock's comparator 216. The player's clock speed may be varied in a number of ways depending on the comparison between the server's clock value and the player's clock value.

In one example, the player's clock speed may be varied according to the difference between the server's clock value and the player's clock value, and may be varied in proportion to the difference between the server's clock value and the player's clock value. In one preferred embodiment, the player's clock speed may be varied according to the formula:

$$s = m(SC(t) - PC(t))/(SC(t) - SC(t-1))$$

where:
s is the speed-up or slow-down ratio with respect to the original speed;
m is the maximum allowable slow-down ratio with respect to the original speed;
PC(t) is the player's clock value at sampling time t; and,
SC(t) is the server's clock value at sampling time t.

The effects and benefits of this can be more fully understood from the following. In general, the streaming server sends data with a definite rate, which depends inter alia on the capturing rate, and expects that the buffer 210 of the media player 200 will never overflow or underflow because it is expected that the media player 200 consumes data according to this definite data rate. This can be regarded as the server sending the media stream with a rate that is equal to consuming rate of a virtual media player on the server system. Therefore, the sending rate or the consuming rate of a virtual media player on the server system depends on the clock rate of the server system. However, the clock rate of the media player 200 may not be equal to the server's clock rate. If the clock rate of the server and the media player 200 are not equal, the buffer 210 will underflow or overflow, which will cause annoying interrupts or data losses respectively.

In the best case, the server's clock and the receiver's clock run at the same rate with just an offset difference. In that case, as is known per se, each frame's Presentation Time Stamp (PTS) is compared in the media player 200 with the player's clock (i.e. the receiver's clock plus offset). If the two match, the frame is presented for display (in the case of video data). (A Presentation Time Stamp indicates the instant at which an encoded picture or audio block should be removed from the receiver buffer, instantaneously decoded, and presented for display.)

However, most probably, the offset between the player's clock and the server's clock will not be constant, since the player's clock may run at a different rate from the server's clock. To provide synchronization of the clock rates of the server and the player, the server's clock value is sent within the bitstream periodically to allow the player to update this value and to keep itself in synchronization with the sender. However, as noted above, merely updating the player's clock periodically to synchronize with the server's clock may cause the player to drop or duplicate audio and/or frames or make some necessary adjustments to the audio to keep audio and video in synchronization.

The presently preferred media player accomplishes synchronization with the server and prevents underflow or overflow conditions of its internal buffer by changing the speed of playback according to the server's clock rate, and particularly the difference between the server's clock rate and the media player's clock rate, instead of directly using the server's clock rate to update media player's master clock.

Whenever the media player reads the server's clock rate data from the media stream, it compares the server's clock rate with its own master clock. If the media player's master clock lags, the playback rate is increased to avoid underflow. Otherwise, if the media player's master clock leads, the playback rate is decreased to prevent overflow.

The clock state value can have one of the 3 values covering the following 3 states:
the player's clock leads the server's clock;
the player's clock lags the server's clock; or
the player's clock is in synchronization with the server's clock.

By way of specific example, assume for example that the media player decodes the server's clock value SC(t−1) from the bitstream as SC(t−1)=10 ms and the player's clock value also reads PC(t−1)=10 ms at time t−1.

At the next time instant t, the player will decode the server's clock value from the bitstream and read the player's clock value from its own clock. Assume for example that SC(t)=20 ms, this being the server's clock value read from the bitstream at time t.

For smooth, synchronized playback, the player's clock value should ideally be equal to the server's clock value as read from the bitstream whenever the server's clock value is read from the stream.

If for example PC(t)=19 ms, then the player's clock lags the server's clock, and the player's clock rate should be increased. On the other hand, if for example PC(t)=21 ms, the player's clock leads the server's clock, and the player's clock rate should be reduced. Finally, if PC(t)=20 ms, the player's clock is already in synchronization with the server's clock, and the player's clock rate is kept the same.

In the above example, where the media player 200 plays back both audio and video, the audio renderer 218 and the video renderer 219 constitute an output component of the media player 200 and the audio speed controller 214 and the video speed controller 215 constitute a rate component of the media player 200. The media player 200 may however play only audio or only video and will have the appropriate renderer only. In principle, other media renderers may be employed.

It will further be noted that in the example described above, the audio speed controller 214 is used to update the player's clock 217, which in turn then updates the video speed controller 215. This is because, in general, skipping or pausing of audio is more noticeable to the user and therefore it is preferable primarily to adjust the playback speed of the audio. However, it is possible to adjust the playback speed of the video directly, for example by sending the output of the clock's comparator 216 to the video speed controller 215 much as described above when the output of the clock's comparator 216 is sent to the audio speed controller 214. This may be done instead of or in addition to adjusting the playback speed of the audio directly as described above.

In all of the examples above, the arrangement is preferably such that the pitch of the audio is not affected when the playback speed of the audio is varied. A number of techniques for achieving this are known.

Embodiments of the invention have been described with particular reference to the examples illustrated. However, it will be appreciated that variations and modifications may be made to the examples described within the scope of the invention. For example, whilst in the embodiment described above, the demultiplexer device 211 reads the server's clock value as provided by the server in the media stream, the server's clock value can be obtained in other ways. For example, the clock value can be sent from the server in the same stream but in a different channel. In this case, the clock value should be related to the stream sent. For instance, 10 Kbytes of data is typically equivalent to 200 ms for a stream having a bitrate of 50 Kbytes per second. In another example, the server and the player read the clock value from a different source, namely a third party source. When the server prepares the stream for transmission, instead of inserting clock values, it inserts some pointers which point at the third party source. When the player receives each pointer, it reads the clock value from the third party source and compares it with its own clock value. It should be noted that this particular example requires that the access time to the third party clock source is extremely fast.

The invention claimed is:

1. A streaming media player for receiving from a server a media stream as an input and for generating a corresponding media stream as an output, the media player comprising:
a clock comparator arranged to compare a clock value of a server from which a media stream is received as an input with a clock value of the player, and to generate a clock state value representing how much the server's clock value lags or leads the player's clock value;
an output component arranged to generate an output media stream corresponding to said input media stream; and,
a rate component arranged to receive a said clock state value from the clock comparator and to vary the rate of output of the media stream from the output component in dependency on the clock state value,
wherein the rate component is arranged to vary the rate of output of the media stream from the output component according to the formula:

$$s=m(SC(t)-PC(t))/(SC(t)-SC(t-1))$$

where:
s is the speed up or slow down ratio with respect to the original rate of output;
m is the maximum allowable slow down ratio with respect to the original rate of output;
PC(t) is the player's clock value at sampling time t; and,
SC(t) is the server's clock value at sampling time t.

2. A streaming media player according to claim 1, wherein the rate component is arranged to vary the rate of output of the media stream from the output component in proportion to the difference between the server's clock value and the player's clock value.

3. A streaming media player according to claim 1, wherein the output component is arranged to generate an output media stream that comprises audio.

4. A streaming media player according to claim 3, wherein the output component is arranged so that a change in the rate of output of the media stream does not affect the pitch of the audio that is output by the output component.

5. A streaming media player according to claim 1, wherein the output component is arranged to generate an output media stream that comprises synchronized audio and video.

6. A streaming media player according to claim 5, wherein the output component is arranged so that a change in the rate of output of the media stream does not affect the pitch of the audio that is output by the output component.

7. A streaming media player according to claim 5, wherein the clock comparator is arranged to provide the clock state value to an audio speed controller of the rate component to control the rate of output of audio from the player, the audio speed controller is arranged to control a clock of the player, and the clock of the player is arranged to control a video speed controller which is arranged to control the rate of output of video from the player.

8. A method in a streaming media player of generating a media stream as an output corresponding to a media stream received as an input to the streaming media player from a server, the method comprising:
comparing a clock value of a server from which a media stream is received as an input with a clock value of the player;
generating a clock state value representing how much the server's clock value lags or leads the player's clock value;
generating an output media stream corresponding to said input media stream; and,
varying the rate of output of the media stream from the output component in dependency on the clock state value,
wherein the rate of output of the media stream is varied according to the formula:

$$s=m(SC(t)-PC(t))/(SC(t)-SC(t-1))$$

where:
s is the speed up or slow down ratio with respect to the original rate of output;
m is the maximum allowable slow down ratio with respect to the original rate of output;
PC(t) is the player's clock value at sampling time t; and,
SC(t) is the server's clock value at sampling time t.

9. A method according to claim 8, wherein the rate of output of the media stream is varied in proportion to the difference between the server's clock value and the player's clock value.

10. A method according to claim 8, wherein the media stream comprises audio.

11. A method according to claim 10, wherein a change in the rate of output of the media stream does not affect the pitch of the audio that is output by the output component.

12. A method according to claim 8, wherein the media stream comprises synchronized audio and video.

13. A method according to claim 12, wherein a change in the rate of output of the media stream does not affect the pitch of the audio that is output by the output component.

14. A method according to claim 12, wherein the clock comparator provides the clock state value to an audio speed controller of the rate component to control the rate of output of audio from the player, the audio speed controller controls a clock of the player, and the clock of the player controls a video speed controller which controls the rate of output of video from the player.

15. A method according to claim 8, wherein the server's clock value is embedded within the input media stream received from the server.

16. A method according to claim 8, wherein the server's clock value is provided by the server to a source that is separate from the server and the media player and wherein the media player obtains the server's clock value from said separate source.

17. A computer program embodied on a non-transitory computer-readable medium, wherein the computer program comprises program instructions for instantiating a streaming media player on a computer to perform the steps:
- comparing a clock value of a server from which a media stream is received as an input with a clock value of the player;
- generating a clock state value representing how much the server's clock value lags or leads the player's clock value;
- generating an output media stream corresponding to said input media stream; and,
- varying the rate of output of the media stream from the output component in dependency on the clock state value,
- wherein the rate of output of the media stream is varied according to the formula:

$$s = m(SC(t) - PC(t))/(SC(t) - SC(t-1))$$

where:
- s is the speed up or slow down ratio with respect to the original rate of output;
- m is the maximum allowable slow down ratio with respect to the original rate of output;
- PC(t) is the player's clock value at sampling time t; and,
- SC(t) is the server's clock value at sampling time t.

* * * * *